US007373250B2

(12) United States Patent
Yoon et al.

(10) Patent No.: US 7,373,250 B2
(45) Date of Patent: May 13, 2008

(54) AGPS MODULE TIME SYNCHRONIZATION METHOD AND DEVICE USING SYSTEM TIME INFORMATION IN MOBILE TERMINAL

(75) Inventors: Jae-Seung Yoon, Seoul (KR); Chan-Woo Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 38 days.

(21) Appl. No.: 11/581,115

(22) Filed: Oct. 13, 2006

(65) Prior Publication Data

US 2007/0213931 A1    Sep. 13, 2007

(30) Foreign Application Priority Data

Mar. 7, 2006    (KR) .................. 10-2006-0021514

(51) Int. Cl.
*G01C 21/00* (2006.01)
(52) U.S. Cl. .................. 701/213; 701/214; 370/395.4; 342/358
(58) Field of Classification Search ........ 701/207–215, 701/216, 225; 342/357.12–358; 370/395.4
See application file for complete search history.

(56) References Cited

U.S. PATENT DOCUMENTS

| 6,188,351 | B1 | 2/2001 | Bloebaum |
| 6,204,808 | B1 | 3/2001 | Bloebaum et al. |
| 6,433,734 | B1 | 8/2002 | Krasner |
| 6,662,107 | B2 * | 12/2003 | Gronemeyer ............... 701/213 |
| 6,684,158 | B1 | 1/2004 | Garin et al. |
| 6,735,199 | B1 * | 5/2004 | Ofek .......................... 370/389 |
| 6,778,536 | B1 * | 8/2004 | Ofek et al. .............. 370/395.4 |
| 6,788,249 | B1 | 9/2004 | Farmer et al. |
| 7,080,160 | B2 * | 7/2006 | Cognet et al. .............. 709/248 |
| 2003/0040869 | A1 | 2/2003 | Nir et al. |

* cited by examiner

*Primary Examiner*—Richard M. Camby
(74) *Attorney, Agent, or Firm*—The Farrell Law Firm

(57) ABSTRACT

An Assisted Global Positioning System (AGPS) module time synchronization method and device using system time information in a mobile terminal that perform time synchronization using system frame information and a GPS module operation period in a process of searching for the position of a terminal using the AGPS module in an asynchronous mobile communication system. Accordingly, the GPS module operation period is set to be greater than the system frame period so that GPS system time can be immediately seen when an arbitrary GPS tick interrupt is operated.

12 Claims, 4 Drawing Sheets

AGPS MODULE TIME SYNCHRONIZATION METHOD AND DEVICE USING SYSTEM TIME INFORMATION IN MOBILE TERMINAL

PRIORITY

This application claims priority under 35 U.S.C. § 119 to an application filed with the Korean Intellectual Property Office on Mar. 7, 2006 and assigned Serial No. 2006-21514, the contents of which are incorporated herein by reference.

BACKGROUND OF THE INVENTION

1. Field of the Invention

The present invention relates to an Assisted Global Positioning System (AGPS) module time synchronization method and device, and more particularly to a method and a device for synchronizing AGPS module time using system time information in a mobile terminal of an asynchronous mobile communication system.

2. Description of the Related Art

In general, a Code Division Multiple Access (CDMA) system that is a synchronous mobile communication system performs time synchronization between the system and a mobile terminal using a Pseudo random Noise (PN) sequence where one period is 26.66667 ms to accomplish the time synchronization. The mobile terminal in such a CDMA mobile communication system generates an interrupt signal referred to as a PN roll every period of the PN sequence. Further, such a PN roll interrupt is divided into three phases composed of phases 0, 1 and 2, and the phase of the PN roll is continuously repeated in an order of 0, 1, 2, 0, 1, 2, . . . . The three phases of the PN roll signal currently correspond to 80 ms.

In a case where a GPS module is operated in the asynchronous mobile communication system in which the time synchronization is performed using such a PN sequence, the terminal generates a GPS_sync signal for enabling an AGPS module while tuning it to the phase 0 of the PN roll to produce a GPS tick that is a referential signal of the AGPS module. The GPS tick is a signal that becomes a reference of a GPS module operation and is generated periodically. The GPS tick is synchronized with the PN roll signal of the system through the aforementioned operation. Referring to FIG. 1, a GPS tick period is set as 16 ms. In this case, five GPS ticks correspond to 80 ms, and thus, a GPS tick corresponding to a multiple of five is accorded with the PN roll interrupt.

A process of synchronizing AGPS module time in a synchronous CDMA terminal of the CDMA system that is a synchronous mobile communication system will be discussed with reference to FIG. 1. Hereinafter, AGPS and GPS will not be described since they are distinguished from each other but are described as having the same meaning.

First, CDMA system time can be seen through the synchronous CDMA terminal every PN roll interrupt. Further, when operating the GPS module, the terminal generates a GPS_sync signal to synchronize a GPS tick with the PN roll. Thus, if the GPS module reads time of the previous PN roll to correct offset time of the PN roll and the GPS tick when the GPS tick is generated, the CDMA system time of the current GSP tick can be seen.

Referring to FIG. 1, since there exist two GPS ticks in each of the phases 0 and 1 of a PN roll, it is difficult to correct the offset time. Thus, in a case where the position of the terminal is obtained using the GPS module with two PN roll phases, such as A and B, each of which exists as one GPS tick in the phase while corresponding thereto, the GPS module synchronizes GPS system time.

Accordingly, the GPS module identifies whether the phase of the CDMA PN roll is the phase 2 every periodic GPS tick. The GPS module maintains a standby status until a time point when the CDMA PN roll becomes the phase 2. Thereafter, if the PN roll phase identified in the GPS tick is the phase 2, the GPS module reads the CDMA system time of the previous PN roll to correct an offset between the PN roll and the GPS tick in the time, so the CDMA system time in the correspondent GPS tick can be obtained.

The CDMA system time obtained in such a manner is then used as GPS time information for receiving GPS information from a GPS satellite in the GPS module, and the accuracy of the system time determines the size of GPS search space (code space).

The degree of instability of GPS time that is CDMA system time in a correspondent GPS tick is generally about 10 to 30 microseconds (µs) in the synchronous CDMA system described above. However, if a module for measuring a position is synchronized with GPS time in a Universal Mobile Telecommunications System (UMTS) that is an asynchronous system, the accuracy of the time is a few tens of µs or so, which is equal to CDMA. Otherwise, the accuracy may be 10 ms or more. As such, the system time obtained when the accuracy is 10 ms or more cannot determine a search interval.

Meanwhile, after the GPS module has been enabled, time up to the first phase 2 takes about 80 ms. Thus, the GPS module can be synchronized with the CDMA system time after at most 80 ms from when the GPS module has been enabled.

As described above, when the AGPS module is executed in the synchronous mobile system, a time synchronization method has difficulty in applying to the new UMTS system. Further, the GPS module can perform the time synchronization after standing by for the PN roll of the phase 2 from when the GPS tick has been initially generated. As such, the GPS module should stand by for at most 80 ms until a time point of the PN roll of the phase 2 as described above. However, since 80 ms is time close to 10% of general GPS operation time in the terminal, it may influence the performance of the terminal. That is, there is caused a problem in that Time To First Fix (TTFF) of a GPS takes a long time. Accordingly, a new time synchronization method is needed, which is appropriate when the AGPS module is executed in the asynchronous mobile communication system.

SUMMARY OF THE INVENTION

Accordingly, the present invention has been made to solve the above-mentioned problems occurring in the prior art, and it is an object of the present invention to provide a device and a method for implementing AGPS module time synchronization in a mobile terminal of an asynchronous mobile communication system.

It is another object of the present invention to provide a device and a method, wherein fast time synchronization is performed in accordance with execution of an AGPS module in a mobile terminal so that TTFF and sensitivity of a GPS can be enhanced.

In order to accomplish these objects of the present invention, according to an aspect of the present invention, there is provided a method for synchronizing AGPS module time using system time information in an asynchronous mobile terminal, which includes receiving a message having a time stamp for a referential system frame number contained therein from a system; generating a GPS module operation period to generate a GPS tick every period and to synchronize an initially generated GPS tick with a boundary of a system frame period; identifying a time point when a GPS tick interrupt and a system frame correspond to each other after synchronization, and imparting a number to each phase interval in which the interval until the corresponding time point is divided by the system frame period; and reading the system frame and the phase interval number of a generation time point when a predetermined GPS tick is generated to identify a system time of the GPS tick generation time point.

In order to accomplish these objects of the present invention, according to another aspect of the present invention, there is provided a device for synchronizing AGPS module time using system time information in an asynchronous mobile terminal, which includes a radio unit for receiving a message having a time stamp for a referential system frame number contained therein from a system; a GPS module operation period generator for generating a GPS module operation period to generate a GPS tick every period; a system frame period generator for generating a system frame period; and a controller for synchronizing a GPS tick initially generated from the GPS module operation period generator with a boundary of a system frame period, identifying a time point when a GPS tick interrupt and a system frame correspond to each other after synchronization to impart a number to each phase interval in which the interval until the corresponding time point is divided by the system frame period, and reading the system frame and the phase interval number of a generation time point when a predetermined GPS tick is generated to identify a system time of the GPS tick generation time point.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
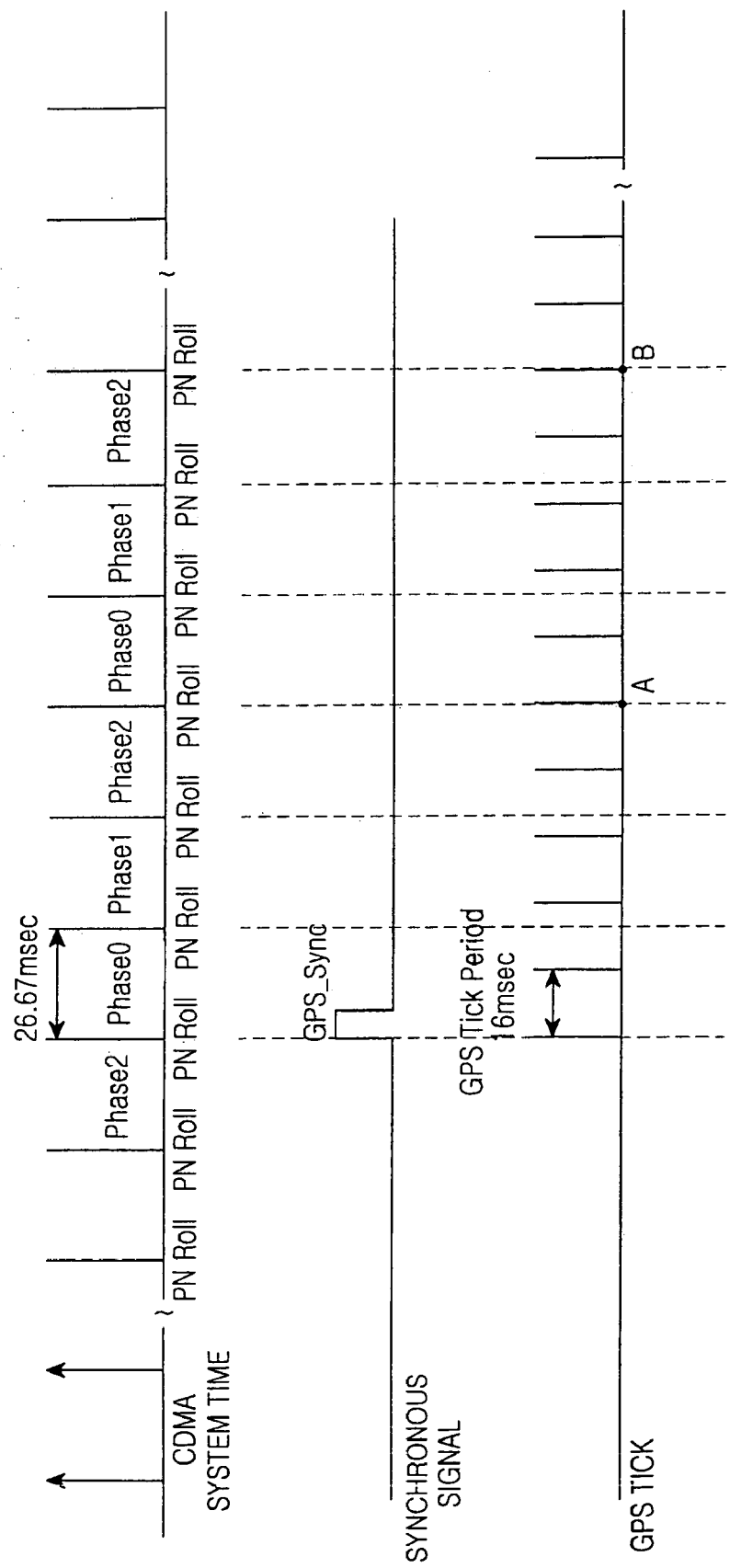
FIG. 1 is a view illustrating a time synchronization operation when operating an AGPS module in a mobile terminal of a general synchronous mobile communication system.

Hereinafter, preferred embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In a process of obtaining the position of a terminal through an AGPS method in an asynchronous mobile communication system, there is provided a time synchronization method of an AGPS module as a method for enhancing Time To First Fix (TTFF) and sensitivity of a GPS module. Such time synchronization of the AGPS module is performed using precise time information received from the system to reduce a code search range in a code searching process performed for the purpose of obtaining an initial signal of a GPS satellite after enabling the GPS module.

In the present invention, there is provided a plan in which time synchronization is performed using received system frame information and an operational period of the GPS module when implementing the time synchronization of the AGPS module in a new asynchronous mobile terminal communication system. Further, a UMTS system will be described as an example of the asynchronous mobile communication system of the present invention.

A configuration and operation of synchronizing time for the AGPS module in a mobile terminal of the asynchronous mobile communication system will be discussed below with reference to FIG. 2.

A radio unit 202 transmits/receives radio frequency (RF) signals.

The AGPS module 204 is provided with a circuit for receiving a GPS signal and converting the received GPS signal into a digital format.

A controller 200 performs a general control of the mobile terminal. It is assumed that the referential system frame number contained in a message received through the radio unit 202 of the present invention is k0. The controller 200 generates a system frame period with a unit of 10 ms from a referential system frame through a system frame period generator 210 and then outputs it to a GPS tick time calculator 206. Further, the controller 200 generates a GPS module operation period through a GPS module operation period generator 208 to output it to the GPS tick time calculator 206. When generating the GPS module operation period in the present invention, the controller 200 sets it to be greater than a UMTS system frame period. Further, the controller 200 evaluates the least common multiple of the GPS module operation period and the UMTS system frame period to search for a time point when the GPS tick and the system frame correspond to each other. Furthermore, the controller 200 divides the least common multiple evaluated as described above by 10 ms that is the system frame period to evaluate the number of system frame intervals, and then specifies a phase number for each of the system frame intervals. In addition, when operating the AGPS module 204, the controller 200 accords the system frame with a time point when a GPS tick is generated, and reads the frame phase corresponding to the generated specific GPS tick to calculate a time difference dT between the system frame interval of the currently generated GPS tick and the previous system frame interval. Thereafter, when an arbitrary GPS tick is generated, the controller 200 calculates a system time for the currently generated GPS tick using the system frame so that time can be synchronized.

Figure 2:
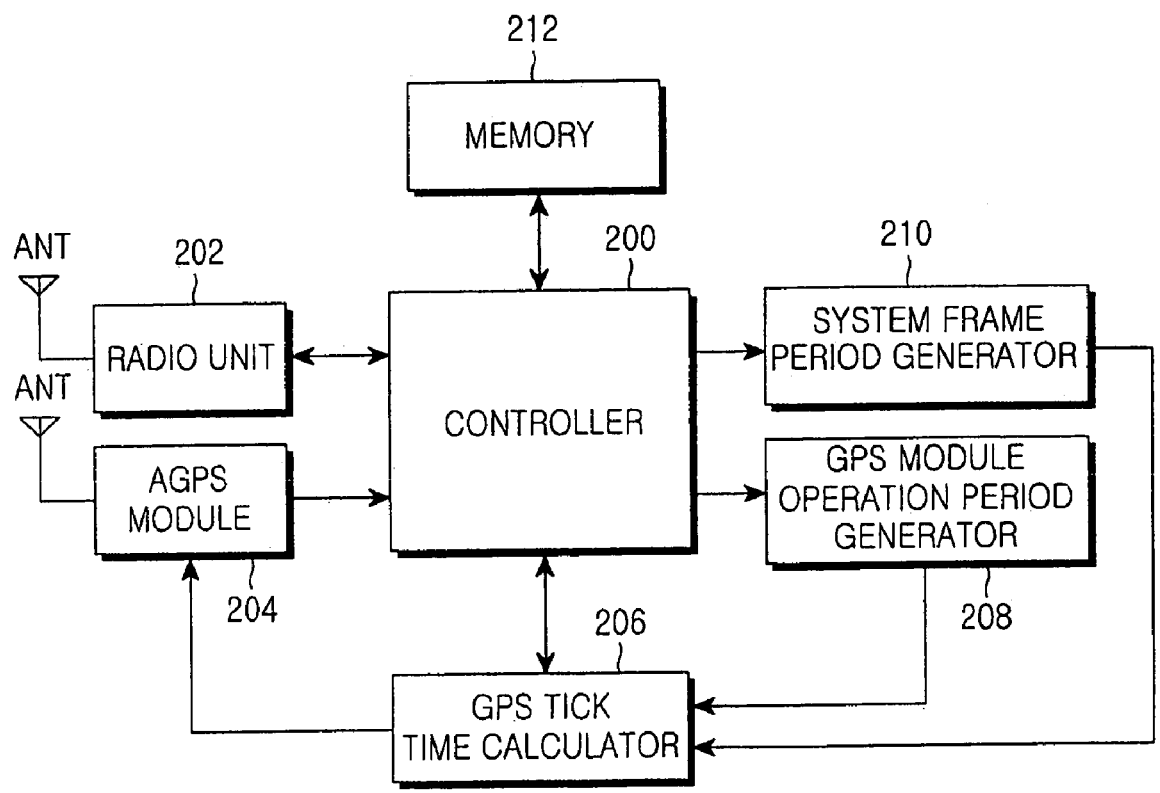
FIG. 2 is a block diagram showing an internal configuration of a mobile terminal for time synchronization when operating an AGPS module in the mobile terminal of an synchronous mobile communication system according to the present invention.
Figure 3:
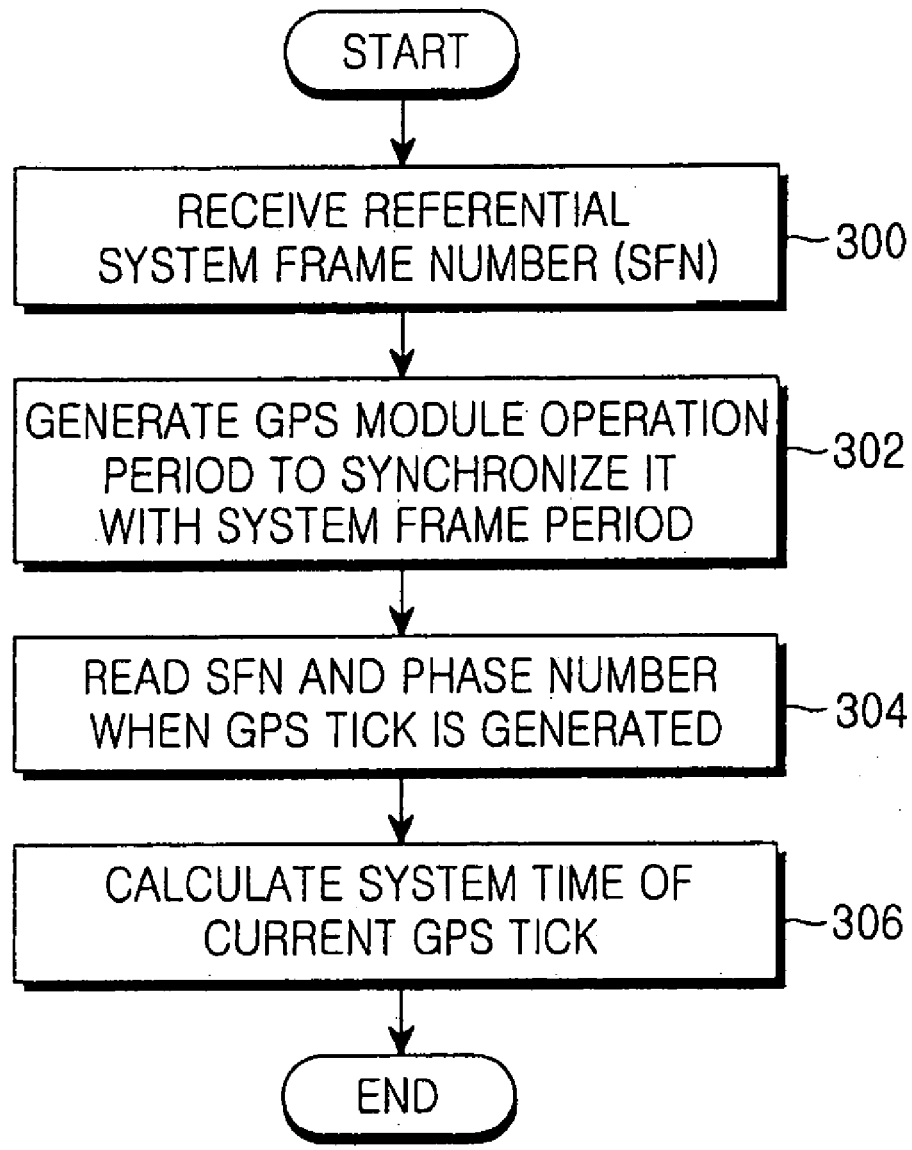
FIG. 3 is a flowchart illustrating a process of performing time synchronization of an AGPS module in the mobile terminal according to the present invention.

Then, a process of synchronizing time for the AGPS module in the asynchronous mobile terminal configured as shown in FIG. 2 will be discussed with reference to FIGS. 3 and 4.

First, the mobile terminal receives a message having a time stamp for a referential system frame number contained therein from a system server through the radio unit 202 at step 300. The time stamp is transmitted from a system included in User Equipment (UE) positioning GPS assistance data fully described in Clause 10.3.7.90 of the 3d Generation Partnership Project (3GPP) Technical Specification (TS) 25.331 in the 3GPP standards. Further, in the UE positioning GPS assistance data, there is a 'UE positioning GPS reference time' message having a time stamp for the system frame number contained therein. The message is fully described in Clause 10.3.7.96 of 3GPP TS 25.331. In a case where the AGPS module 204 is synchronized with GPS time, it is assumed that the time stamp has an error of a few to a few tens of μs similar to that in a synchronous CDMA system.

The mobile terminal assumes the referential system frame number contained in the received message is k0 at step 300. Thereafter, if there exists an input for driving the AGPS module 204, the mobile terminal generates an enable signal of the AGPS module 204.

Figure 4:
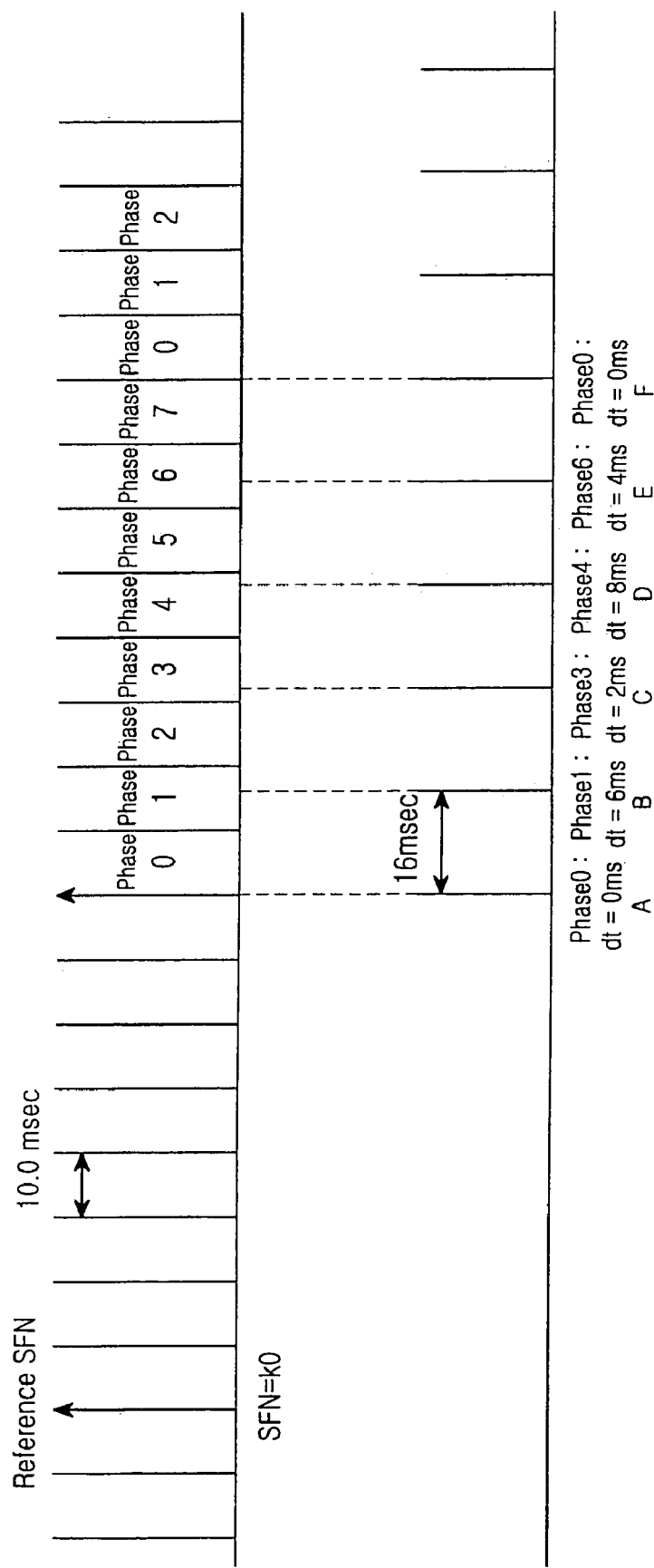
FIG. 4 is a view illustrating an operation for time synchronization when operating an AGPS module in the mobile terminal according to the present invention.

The mobile terminal generates a GPS module operation period in accordance with the enable signal of the AGPS module 204 to synchronize it with the system frame period as shown in A of FIG. 4 at step 302. The mobile terminal synchronizes an initially generated GPS tick with a boundary (UMTS boundary) of the system frame period.

The mobile terminal sets the GPS module operation period generated from the GPS module operation period generator 208 to be greater than the UMTS frame period with a period of 10 ms at step 302. In the present invention, the GPS tick corresponds to the frame period with a period of 10 ms at a specific tick (ms). The specific tick corresponding in such a manner can be evaluated with the least common multiple of 10 ms and the GPS module operation period. For example, in a case where the GPS module operation period is set as 16 ms, as shown in FIG. 4, the system frame and the GPS tick correspond to each other at the least common multiple of 10 ms and 16 ms. Then, the number of system frames for a time of 80 ms can be evaluated using the following Equation (1).

$$p = x\text{Tick}/\text{system frame period} \quad (1)$$

In Equation (1), p denotes the number of system frames for a time of 80 ms, and "xTick" means the least common multiple of a system frame period and a GPS module operation period. When "xTick" is 80 ms in FIG. 4, p becomes 8, and phase numbers of 0 to p−1 are respectively allocated to system frame intervals to distinguish them. Then, since one or fewer GPS ticks exist within one system frame interval, system time for all the GPS ticks. Thus, in the present invention, the GPS module operation period is set to be greater than the UMTS frame period as described above, so a delay generated when performing time synchronization in a synchronous mobile system can be prevented.

Thereafter, if a specific GPS tick is generated at step 304, the mobile terminal reads the system frame number and phase number of the frame interval just before the correspondent GPS tick is generated.

Thereafter, the mobile terminal calculates the system time of the current GPS tick at step 306. If the system frame number read at step 304 is k1, the system time of the current GPS tick can be evaluated using the following Equation (2).

$$\text{system time of current GPS tick} = \text{system time of referential system frame number} + \text{system frame period} \times (k1-k0) + dT \quad (2)$$

Referring to Equation (2), the system time of a referential system frame number is a GPS time tag, and dT denotes a time difference between a current GPS tick and a frame interval just before the current GPS tick. Such a time difference can be obtained by reading the phase of the current frame interval.

Since the GPS module operation period is greater than 10 ms, the phase of the frame interval read in the GPS tick is uniform. On this account, the mobile terminal previously evaluates dT, which is an offset between a frame interval and a GPS tick for each phase, and then stores it in a look-up table of the memory 212.

As described above, the present invention sets a GPS module operation period to be greater than a system frame period in performance of time synchronization when operating an AGPS module in a mobile terminal of the UMTS so GPS system time can be immediately seen when an arbitrary GPS tick interrupt is generated.

The system time calculated as described above may be used afterwards as GPS time information for a GPS position search, and system time accuracy determines the size of a GPS search interval. In the synchronous system, it is assumed that the instability degree of GPS time is about 10 μs when a GPS tick interrupt of such system time is generated. In the UMTS system, it is assumed that the accuracy of the time is also about 10 μs considering a case where the AGPS module is synchronized with the GPS time. On the other hand, since the accuracy is around a few tens of ms in a case of the asynchronous method, the GPS time currently read cannot determine a search interval but may be used as receiver reference time for use in searching a position of a satellite or the like.

As described above, the present invention performs time synchronization using system frame information and a GPS module operation period in a process of searching a position of a terminal using an AGPS module in an asynchronous mobile communication system. At this time, there is an advantage in that the GPS module operation period is set to be greater than the system frame period so that GPS system time can be immediately seen when an arbitrary GPS tick interrupt is operated.

Further, since the CDMA PN roll period, which is 26.66667 ms, is greater than a general GPS operation period in a time synchronization method of an existing synchronous mobile communication system, time synchronization is possible after standing by up to a phase interval where a PN roll and a GPS tick correspond to each other. On this account, there is a problem in that TTFF of GPS is delayed. However, if the time synchronization method of the present invention is applied, there is an advantage in that time synchronization is immediately possible at the same time when a first GPS tick interrupt is generated.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for synchronizing Assisted Global Positioning System (AGPS) module time using system time information in an asynchronous mobile terminal, the method comprising:

receiving a message having a time stamp for a referential system frame number contained therein from a system;

generating a Global Positioning System (GPS) module operation period to generate a GPS tick every period and to synchronize an initially generated GPS tick with a boundary of a system frame period;

identifying a time point when a GPS tick interrupt and a system frame correspond to each other after synchronization, and imparting a number to each phase interval in which an interval until a corresponding time point is divided by the system frame period; and reading the system frame and the phase interval number of a generation time point when a predetermined GPS tick is generated to identify a system time of the GPS tick generation time point.

2. The method as claimed in claim 1, wherein the GPS module operation period is set to be greater than the system frame period.

3. The method as claimed in claim 1, wherein the identifying step further comprises identifying the time point by evaluating a least common multiple of the system frame period and the GPS module operation period.

4. The method as claimed in claim 3, further comprising evaluating respective intervals in which the interval until the corresponding time point is divided by the system frame period using $p = x\text{Tick/system frame period}$ wherein p denotes a number of system frames until the corresponding time point, and xTick means a least common multiple of a system frame period and a GPS module operation period.

5. The method as claimed in claim 4, further comprising calculating a system time of a current GPS tick when a predetermined GPS tick is generated using system time of current GPS tick=system time of referential system frame number+system frame period×$(k1-k0)+dT$ wherein k1 denotes a system frame number read when the predetermined GPS tick is generated, the system time of a referential system frame number denotes GPS time tag information received from a server, and dT denotes a time difference between a current GPS tick and a frame interval just before the current GPS tick.

6. The method as claimed in claim 5, further comprising previously calculating dT to store it in a look-up table.

7. A device for synchronizing Assisted Global Positioning System (AGPS) module time using system time information in an asynchronous mobile terminal, comprising;

a radio unit for receiving a message having a time stamp for a referential system frame number contained therein from a system;

a Global Positioning System (GPS) module operation period generator for generating a GPS module operation period to generate a GPS tick every period;

a system frame period generator for generating a system frame period; and a controller for synchronizing a GPS tick initially generated from the GPS module operation period generator with a boundary of a system frame period, identifying a time point when a GPS tick interrupt and a system frame correspond to each other after synchronization to impart a number to each phase interval in which the interval until the corresponding time point is divided by the system frame period, and reading the system frame and the phase interval number of a generation time point when a predetermined GPS tick is generated to identify a system time of the GPS tick generation time point.

8. The device as claimed in claim 7, wherein the system frame period generator sets the GPS module operation period to be greater than the system frame period.

9. The device as claimed in claim 7, wherein the controller evaluates a least common multiple of the system frame period and the GPS module operation period to identify the time point when the GPS tick interrupt and the system frame correspond to each other.

10. The device as claimed in claim 9, wherein the controller evaluates respective intervals in which the interval until the corresponding time point is divided by the system frame period using;

$p = x\text{Tick/system frame period}$ wherein p denotes a number of system frames until the corresponding time point, and xTick means a least common multiple of a system frame period and a GPS module operation period.

11. The device as claimed in claim 10, wherein the controller reads the system frame number and phase number of the frame interval just before the correspondent GPS tick is generated when a predetermined GPS tick is generated to calculate a system time of a current GPS tick using system time of current GPS tick=system time of referential system frame number+system frame period×$(k1-k0)+dT$ wherein k1 denotes a system frame number read when the predetermined GPS tick is generated, the system time of a referential system frame number denotes GPS time tag information received from a server, and dT denotes a time difference between a current GPS tick and a frame interval just before the current GPS tick.

12. The device as claimed in claim 11, further comprising a memory for storing dT and a frame interval just before the current GPS tick, in a look-up table, wherein the controller previously calculates dT to store it in the look-up table.

* * * * *